Patented Aug. 19, 1941

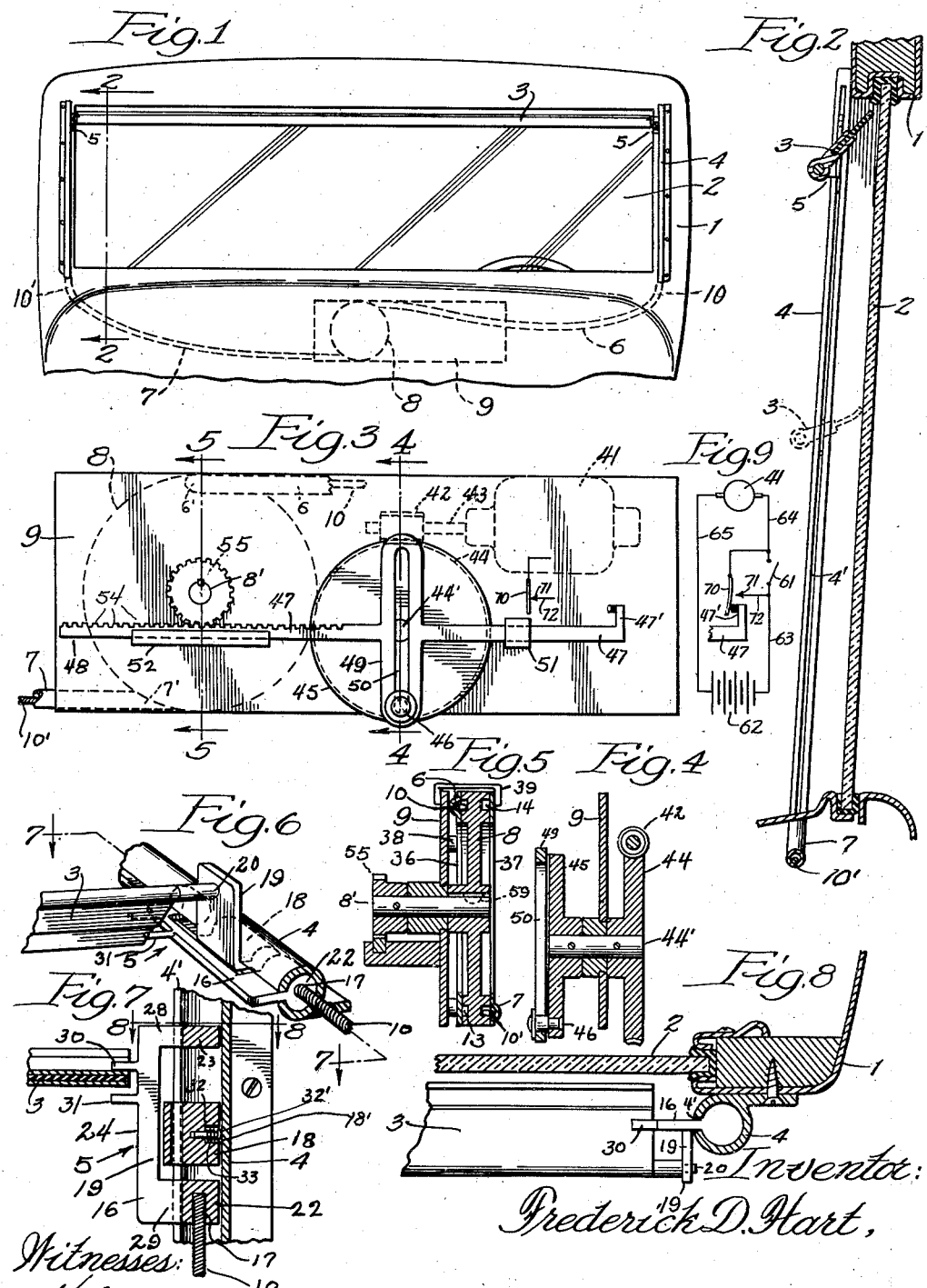

2,253,029

UNITED STATES PATENT OFFICE 2,253,029

WINDSHIELD WIPER

Frederick D. Hart, Middlesboro, Ky.

Application June 14, 1939, Serial No. 279,024

4 Claims. (Cl. 15—253)

This invention relates to improvements in windshield wiper appliances for automobiles and more especially to actuating means therefor. The main objects of the invention are to provide an improved form of wiper and operating means; to provide for vertical rectilinear movement of a horizontal wiper over substantially the entire face of the windshield; to minimize the power requirements for operation; to provide automatic motivating means therefor adapted to render the wiper effective on its downward stroke and substantially free on its upward stroke; to provide means of substantially similar design at each end of the windshield for operating the wiper; to provide thus for both raising and lowering the wiper and for tilting the wiper alternately out of and into contact with the windshield as it operates; to connect these lateral means operatively to a common source of motive power; and to provide such an equipment of simple design and adapted to be made and maintained at low cost.

This invention is illustrated by the accompanying drawing in which:

Figure 1 is a front elevation of the windshield and wiper, together with the adjacent part of the car, as viewed from the outside, the wiper being fully raised.

Fig. 2 is an enlarged vertical section on the line 2—2 of Fig. 1.

Fig. 3 is a similarly enlarged view of the gear mounting plate and apparatus thereon, viewed from the front of the car, as shown by dotted lines on Fig. 1, but apart from the vehicle, the operating gear being in position corresponding with the dotted view of the wiper on Fig. 2.

Fig. 4 is a section on the line 4—4 of Fig. 3.

Fig. 5 is a section on the line 5—5 of Fig. 3.

Fig. 6 is an enlarged perspective upward-movement view of the right end of the wiper as viewed from outside the car and as indicated at the right side of Fig. 1, with associated carrier mounting and operating connections.

Fig. 7 is a substantially vertical axial section through the right end of the wiper and corresponding carrier mounting, as viewed in Fig. 1 on a vertical axial plane in front of and parallel with the windshield, reference being had to line 7—7 on Fig. 6.

Fig. 8 is a horizontal section taken on line 8—8 of Fig. 7.

Fig. 9 is a circuit diagram illustrating the manual starting and automatic stopping of the windshield wiper motor.

Referring more in detail to the drawing, the car 1, part of which is shown in front elevation in Figure 1, has a windshield 2 which is equipped with my improved wiper indicated at 3. This wiper is carried on a pair of lateral upright car-supported guides 4 which are engaged slidably by wiper end carriers 5. Said guides 4 have convergently curved extension guide members 6 and 7 respectively which lead to a centrally disposed oscillatory drive wheel or drum 8 which they approach somewhat diagonally on opposite sides and about tangentially, as will be more fully explained, right guide 6 at the top and left guide 7 at the bottom thereof. Said wheel 8 is pivotally mounted at 8' on a gear-supporting plate 9 attached to the interior of the car beneath the windshield, as indicated by dotted lines on Fig. 1.

Operating energy is supplied to the wiper 3 by means of resilient flexible rods or cables 10 and 10' disposed in the lateral guides 4 and in their extensions 6 and 7 respectively. The upper ends of these cables are fixed to said carriers 5 respectively on which the wiper is pivotally supported; and the lower converging ends are secured to diametrically opposite fixed points on and adjacent the periphery of wheel 8, which is laterally grooved at 13 and 14 to receive the inner end parts of said cables 10 and 10' as they wind on wheel 8 for lowering the wiper 3. From these grooves 13 and 14 they unwind by reverse rotation of wheel 8 for raising said wiper by upward push on its end supports or carriers 5.

Each carrier 5 is made in two main parts and comprises U-shaped oblong member 16 to which a corresponding cable 10 is attached as at 17 and a relatively movable block 18 having an arm 19 on which the wiper is pivoted as at 20.

The U-member 16 comprises a pair of solid heads 22 and 23 fitting in a guide 4, one above the other, a U-shaped flat connecting body 24 having a pair of fingers 30 and 31 disposed one above the other for tilting the wiper 3, an edge of which is disposed loosely therebetween.

The tubular guides 4 are slotted at 4' to accommodate the carrier parts 19 and 24.

U-arms 28 and 29 are long enough to give clearance between the connecting part 30 and the guide 4 to accommodate the forwardly turned arm 19 of carrier block 18.

There is also vertical clearance between the U-heads (22 and 23) and the intermediate carrier block 18 so as to accommodate movement lag in member 18 relative to member 16. Such lag is further assured by the friction brake pin 32 carried by member 18. (See Fig. 7.) Here the pin 32 is urged outward from block socket 18' by a compression spring 33 bearing against the head 32'.

The space between the upper and lower heads 22 and 23 of the U-frame 16 is such as to assure relative movement of said members 16 and 18 sufficient to oscillate the wiper 3 on its pivots 20 by alternate forced contact with the two vertically spaced pins or fingers 30 and 31 on the U-member 16. Pin 30 pulls the wiper against the glass and pin 31 pushes it away.

Referring now more in detail to the winding disc or drum 8 and its related mechanism, it is to be observed that the cable guides 6 and 7 terminate substantially in discoidal shields or guide plate rings 36 and 37 respectively, held rigidly adjacent to and substantially against the front and back sides of the drum 8, but in substantially frictionless relation thereto. The guide tubes 6 and 7 are joined diagonally at 6' and 7' to these plates as best shown in Fig. 3. These annular shields 36 and 37 are secured rigidly to the mounting plate 9 by connectors 38 and 39 respectively.

The winding grooves 13 and 14 are of sufficient length to accommodate winding of the corresponding cables without overlap upon lowering the wiper 3.

In order to oscillate the drum 8 for raising and lowering said wiper, it is geared, as follows, to a battery motor 41 also located under the windshield. Said motor has a worm 42 fixed on its shaft 43; and this worm coacts with a worm wheel 44 pivoted on the back of plate 9, at the right side of drum 8, as viewed in Fig. 3. Another wheel 45 on the front side of plate 9, is fixed on the same pivot 44' with wormwheel 44. This wheel 45 has a crankpin 46 appropriately spaced from its axis for driving the T-rack 47 also mounted on plate 9.

This rack is cross-shaped and comprises a toothed horizontal part 48 with a medial cross part 49, the latter having a vertical slot 50 to receive said crankpin 46 for reciprocating said rack horizontally in its guiding supports 51 and 52 fixed on plate 9. The teeth 54 of said rack part engage a pinion 55 fixed on the pivot pin 8' whereon drum 8 is keyed at 59. Operation of the motor in either direction rotates the wheels 44 and 45, and the resultant revolution of crankpin 46 oscillates the rack 47 horizontally. Movement of said rack to the left, on Fig. 3, raises the wiper and movement to the right pulls it down, as will be apparent.

Whenever it is desired to operate the wiper, the driver starts the motor 41 by appropriate manual switching means, not shown. The motor then transmits its power through shaft 43, worm 42, wormwheel 44, pivot 44', wheel 45, crankpin 46, rack 47, pinion 55, pivot 8', and drum 8, the movement of drum 8 being oscillatory by reason of the crankpin 46 causing the rack 47 to reciprocate.

Assuming that the cables 10 and 10' are entirely unwound and projected to raise the wiper to its topmost position, the initial movement will be rotation of the drum 8 to the left or counter-clockwise, whereby said cables will be drawn downwardly and wound in their corresponding grooves. When the cables start to pull downwardly on the carrier U-member 16, the top pin 30 will bear downwardly on the upper side of the wiper and oscillate the wiper sufficiently to bring its effective wiping edge against the windshield. A further downward movement of the carrier part 16 will cause its upper head 23 to bear against the pivot member 18 and thereupon the wiper will be forced downwardly over the face of the windshield.

When the downward limit is reached, the wiper is ready for reverse movement and the cables 10 and 10' will then begin to unwind from their drum slots and act upwardly on the wiper carriers. At first the member 16 will start to move upwardly and its lower finger bearing on the under side of the wiper will cause the latter to tilt away from the windshield. Further upward movement of member 16 will cause its lower head to bear against the pivot member, whereupon the wiper as a whole will begin to move upwardly. This will continue until it is fully raised and then the same cycle of operation will be repeated and will so continue until the operator stops the motor.

It will be noted that this mode of operation permits the energy of the motor to be directed to wiping effect on downward movement of the wiper and lifting action alone on the upward movement. This permits efficient use of a smaller sized motor than would otherwise be required.

In order to assure stopping of the motor when the wiper has completed its movement downward and upward and so leave the wiper at the top of the windshield, electrical connections are provided as shown in the circuit diagram, Fig. 9. Here the motor circuit is normally open. When the operator closes switch 61 current will flow from the battery 62 through lead 63, switch 61, lead 64, motor 41 and lead 65 back to the battery.

Normally when the wiper is at rest at the top of the windshield the spring switch 70 is held open by the tip 47' of rack member 47. Then, as the rack moves to the right as viewed on Fig. 3, it releases switch 70 which automatically closes on contact 71. As soon as the motor starts and switch 70 is closed the operator releases and opens switch 61 whereupon current flows past switch 61, the circuit now being from battery 62, through lead 63, lead 72, contact 71, switch 70, lead 64, motor 41 and lead 65 back to the battery.

The motor continues to operate on this latter circuit until the rack completes its forward and backward movement. When it reaches the end of its travel to the left as shown in Fig. 4, it operates to open spring switch 70 as apparent from Fig. 9. The motor then stops and remains at rest until the operator again closes switch 61 when the down and up sweep of the wiper is repeated.

It is to be understood that some of the details set forth may be altered or omitted without departing from the spirit of this invention as defined by the following claims.

I claim:

1. A windshield wiper device of the class described comprising a pair of lateral guides secured adjacent the windshield, a vertically operable wiper slidably mounted on said guides, carrier means at each end by which said wiper is supported on said guides and automatic means to raise and lower said carrier means, said carrier means each comprising two relatively movable parts one in lag relation to the other and on one of which the wiper is pivotally mounted for oscillation into and out of contact with the windshield and the other having vertically spaced pins to engage the ends of the wiper above and below for tilting it away from the windshield on upward movement and oppositely on downward movement.

2. A device of the class described, comprising a pair of appropriately spaced vertical guideways in combination with a windshield wiper disposed therebetween and in operative relation thereto, a carrier therefor at each end, each said carrier comprising a free-sliding U-shaped member having spaced pins to operate alternately against the upper and lower sides of the windshield wiper to tilt the same, and another member disposed slidably and in friction retard relation to its guideway and between the arms of the U-member on which latter member said windshield is pivotally mounted, and driving means connected to said U-members to raise and lower said carriers with said wiper thereon.

3. A windshield wiper equipment comprising on one side a vertical tubular guideway having a longitudinal slot on its side in combination with a carrier including a center body frictionally slidable in said guideway and provided with an arm extending through said slot on which arm the wiper is pivoted and a U-member the arms of which on their tips are provided with heads respectively also slidable in said guideway on opposite sides of said center body in spaced relation thereto so as to provide lag in the movement of said body relative to the U-member, said U-member on its connecting part having a pair of vertically-spaced pins between which the ends of the wiper are receivable for tilting by said U-member when the carrier is raised and lowered by force applied to said U-member.

4. In a device of the class described, a pair of windshield wiper end supports each comprising a two-part carrier including a block whereon said wiper is pivoted and a U-member having heads disposed in spaced relation one over the other on the ends of the U-arms, and means whereby said U-members are raised and lowered, the block in each carrier being frictionally retarded and movable vertically between the heads of the U-member, and the latter having means thereon for engaging the wiper to tilt the same

FREDERICK D. HART.